3,697,459
AROMATIC POLYMERS CONTAINING AN ELEMENT OF THE PHOSPHORUS FAMILY
Bobby F. Dannels and Alvin F. Shepard, Grand Island, N.Y., assignors to Hooker Chemical Corporation, Niagara Falls, N.Y.
No Drawing. Continuation of application Ser. No. 749,983, Aug. 5, 1968, which is a continuation-in-part of application Ser. No. 414,867, Nov. 30, 1964. This application Mar. 20, 1970, Ser. No. 19,561
Int. Cl. C08g 5/18, 51/62
U.S. Cl. 260—17.2    10 Claims

ABSTRACT OF THE DISCLOSURE

Novel esters of a member of the phosphorus family and a phenol-aldehyde or phenol-ketone condensate are characterized in that:
(1) a major proportion of the moiety of the member of the phosphorus family has the formula $$-O-\underset{X}{M}-O-$$

in which the unsatisfied bonds are attached to aryl nuclei of the same phenolic condensate, and in which M is an atom of the phosphorus family, and X is halogen, hydroxyl, mercapto, hydrocarbyl, hydrocarbyloxy, halogen-substituted hydrocarbyl, halogen-substituted hydrocarbyloxy, or an aryloxy radical of the same phenolic condensate to which M is attached;
(2) at least 60 percent of the phenol-aldehyde or phenol-ketone condensate has o,o'-alkylidene linkages; and
(3) the phenolic condensate has an average number of aryl nuclei per molecule in the range of 3.5 to 8.

Suitable members of the phosphorus family of elements are phosphorus, arsenic, antimony and bismuth.

The thermoplastic products of the invention can be modified to produce additional thermoplastic products such as reaction products with an oxyalkylation agent. Thermosetting products can be produced by curing the thermoplastic products of the invention with agents such as hexamethylene tetramine, or other donors of methylene radicals, or polyepoxides, or polyisocyanates, and the like. The products are useful to produce shaped articles such as molded articles, laminates, protective coatings, including drying oil varnishes; abrasive structures; friction elements and the like. Other uses are as inhibitors and stabilizers for polymers, in basing cements and as foundry sand binders. The polyurethane derivatives can be used for the preparation of foamed products, castings, coatings, and the like. Compositions of the invention are also useful for the treatment of normally combustible cellulosic materials to render them fire retardant.

REFERENCE TO PRIOR APPLICATION

This is a continuation of application Ser. No. 749,983, filed Aug. 5, 1968, now abandoned, which is a continuation-in-part of application Ser. No. 414,867, filed Nov. 30, 1964, now abandoned.

This invention relates to novel aromatic polymers, and more particularly to novel polymers based on phenol-aldehyde or phenol-ketone condensates. The invention further relates to processes for the preparation of such products.

Phenol-aldehyde condensates are well known for use in molding compounds and many other applications requiring resinous products. For most purposes, the conventional phenol-aldehyde condensates meet the requirements of industry and commerce. However, the conventional phenol-aldehyde condensates show a high loss of weight when subjected to high temperatures for prolonged periods of time. While the fire resistance of the conventional phenol-aldehyde condensates is much better than the fire resistance of many polymeric materials, it is insufficient to satisfy the most stringent requirements encountered in present day commercial and industrial practice.

Accordingly, it is an object of the invention to provide novel polymeric products that have superior thermal stability, fire resistance and chemical resistance. It is a further object of the invention to provide novel aromatic polymers based on phenol-aldehyde and phenol-ketone condensates that have such improved properties. It is another object of the invention to provide polymeric products that exhibit low loss of weight on heating at elevated temperatures, and which further exhibit good hydrolytic stability. A further object of the invention is to provide compositions that are useful as inhibitors and stabilizers for other compositions, particularly polymers such as polyolefins, polyvinylchloride, rubber, and the like. Another object of the invention is to provide novel processes for making such products. These and other objects of the invention will become apparent from a consideration of the following detailed specification.

In accordance with this invention, there are provided esters of a trivalent member of the phosphorus family and a phenol-aldehyde or phenol-ketone condensate, characterized in that:

(1) a major proportion of the moiety of the member of the phosphorus family has the formula $$-O-\underset{X}{M}-O-$$

in which the unsatisfied bonds are attached to aryl nuclei of the same phenolic condensate, and in which M is an atom of the phosphorus family, and X is halogen, hydroxyl, mercapto, hydrocarbyl, hydrocarbyloxy, halogen-substituted hydrocarbyl, halogen-substituted hydrocarbyloxy, or an aryloxy radical of the same phenolic condensate to which M is attached;
(2) at least 60 percent of the phenold-aldehyde or phenol-ketone condensate has o,o'-alkylidene linkages; and
(3) the phenolic condensate has an average number of aryl nuclei per molecule in the range of 3.5 to 8.

The preferred range is an average of about 4 to 6 aryl nuclei per molecule. Members of the phosphorus family of elements, as the expression is employed herein, are the members of Group V of the Periodic Table which have an atomic weight of greater than 30, i.e., phosphorus, arsenic, antimony, and bismuth.

In accordance with another aspect of the invention, the foregoing thermoplastic products of the invention can be modified to produce additional thermoplastic products or to produce thermosetting products. Thermoplastic modifications include reaction products with an oxyalkylation agent such as mono oxirane ring compound, an alkylene halohydrin or an alkylene carbonate. Thermosetting products result from admixture of the thermoplastic products of the invention with such curing agents as hexamethylenetetramine, or other donors of methylene radicals; or polyepoxides; or polyisocyanates and the like.

In other aspects of the invention the foregoing thermoplastic and thermosetting products are utilized to provide shaped articles, such as molded articles; laminates; protective coatings, including drying oil varnishes; abrasive structures; friction elements, and the like.

The phenolic condensates most useful in the practice of the invention are characterized by the following formula

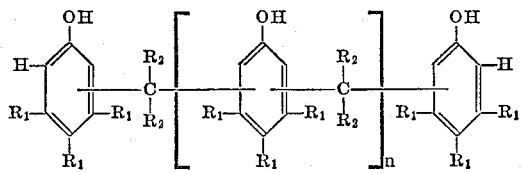

wherein $R_1$ is independently selected from the group consisting of hydrogen, fluorine, chlorine, bromine, and a hydrocarbon radical;

each of the substituents $R_2$ are independently selected from the group consisting of hydrogen, a hydrocarbon radical, and a halogen-substituted aryl radical; and $n$ has an average value of about 1.5 to 6, preferably about 2 to 4.

Preferably, the phenolic condensates are novolacs, which contain more than one mole of the phenol per mole of the aldehyde or ketone. The condensates have at least 60 percent of o,o'-alkylidene linkages joining the phenol and aldehyde or ketone residues. In this specification and claims, the term "alkylidene" is used to express the structural relationship of the substituted methylene residues of the aldehyde or ketone to the phenolic nuclei of the phenolic condensates, and the term is intended to be generic to all such substituted methylene groups defined within the scope of the invention. Such condensates having a high percentage of o,o'-alkylidene linkage can be prepared by a process which comprises heating a mixture of a phenol in substantially anhydrous condition with an inorganic alkali catalyst to a temperature of at least 130 degrees centigrade, then introducing the aldehyde or ketone slowly into the preheated mixture, and maintaining the resulting mixture at a temperature of at least 130 degrees centigrade until all the aldehyde or ketone has been introduced. The process can be conducted at atmospheric or at elevated pressure. Suitable catalysts are the inorganic alkali catalysts such as calcium hydroxide, barium hydroxide, strontium hydroxide, calcium carbonate, barium formate, magnesium hydroxide, zinc oxide, cadmium hydroxide, beryllium hydroxide, potassium hydroxide, sodium hydroxide, and the like. Only a small amount of catalyst is generally used, for example, in the range of 0.02 to 5 percent based on the weight of the phenol. It is generally convenient to slurry or dissolve the alkali catalyst in a small amount of water, and to introduce the resulting slurry or solution into the anhydrous phenol, thereafter raising the mixture of catalyst and phenol to the reaction temperature, thereby removing the water added with the alkali. Under the reaction conditions, the water of the condensation reaction continuously evaporates from the reaction mixture and is normally taken overhead through a distillation zone. The reaction temperature of at least 130 degrees centigrade and up to the boiling point of the phenol is generally maintained until all the aldehyde or ketone has been introduced, and substantially no more water escapes from the mixture at the reaction temperature. Thereafter, the temperature of the mixture can be elevated, if desired, to remove unreacted phenol. An alternative process for producing phenolic condensates having a high percentage of ortho linkage of the phenol and aldehyde or ketone residues involves utilizing a phenol that is substituted in the para-position in a conventional condensation process with an acid catalyst, such as sulfuric acid, hydrochloric acid or oxalic acid. Thereafter, the para-substituent can be removed from the ortho-linked condensate if a curable condensation product is desired. In the condensation processes, the ratio of the aldehyde or ketone to the phenol can be varied to prepare condensates of various molecular weights. Preferably, the ratio is in the range from about 0.5 to 1.0 mole of aldehyde or ketone to one mole of the phenol, preferably from 0.7 to 0.9 mole of aldehyde or ketone per mole of the phenol.

Suitable phenols for use in the preparation of the phenolic condensates have the following formula:

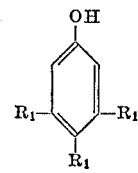

wherein each of the $R_1$ radicals is independently selected from the group consisting of hydrogen, halogen, hydroxyl, hydrocarbyl, hydrocarbyloxy, and hydroxyl-substituted hydrocarbyloxy. The halogen-substituents are preferably chlorine, fluorine, bromine, or mixtures thereof. The hydrocarbon radicals can be alkyl and alkenyl groups of 1 to 18 carbon atoms, preferably 1 to 6 carbon atoms; cycloalkyl groups of 5 to 18 carbon atoms, preferably 5 to 8 carbon atoms, and aryl groups of 6 to 18 carbon atoms, preferably 6 to 10 carbon atoms. Aryl is intended to include alkaryl and aralkyl. Suitable phenols are phenol, cresol, resorcinol, phloroglucinol, 3-methyl-5-ethyl phenol, meta-ethyl phenol, symmetrical xylenol, meta-isopropyl phenol, meta-isooctyl phenol, metal-phenyl phenol, meta-benzyl phenol, meta-cyclohexyl phenol, meta-cetyl phenol, meta-cumyl phenol; meta-methoxy phenol, 3,5-dimethoxy phenol; resorcinol that is mono-oxyalkylated with an alkylene oxide of 1 to 6 carbon atoms, such as ethylene oxide, propylene oxide, and the like; and phloroglucinol that is mono- or di-oxyalkylated with a similar alkylene oxide. The preferred phenols are generally para-unsubstituted as well as ortho-unsubstituted. However, such phenols can be used in admixture with para-substituted phenols such as para-cresol, para-isopropyl phenol, 3,4-dimethyl phenol, para-chloro phenol, para-fluoro phenol, para-bromo phenol, para-phenyl phenol, para-benzyl phenol, para-cyclohexyl phenol, hydroquinone, para-methoxy phenol; hydroquinone that is oxyalkylated with an alkylene oxide such as ethylene oxide or propylene oxide; 3,4-dichloro phenol, 3,4-dimethoxy phenol, and the like.

The preferred aldehyde for preparing the phenolic condensate is formaldehyde, which can be in aqueous solution or in any of its low polymeric forms of paraformaldehyde. The aldehydes preferably contain 1 to 8 carbon atoms. Other examples include acetaldehyde, propionaldehyde, butyraldehyde, 2-ethyl hexaldehyde, benzaldehyde, furfuraldehyde, ethyl butyraldehyde, pentaerythrose, and the like. The ketones useful in preparing the phenolic condensates have the formula:

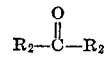

wherein each of the $R_2$ radicals represents an organic radical. The organic radicals are preferably hydrocarbon radicals of 1 to 7 carbon atoms. Examples of suitable ketones include acetone, methyl ethylketone, diethyl ketone, methyl benzyl ketone, methyl cyclohexyl ketone, diallyl ketone, as well as mixtures thereof.

The preferred compounds for reaction with the phenolic condensates are those having the following formula:

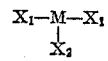

wherein

M is a member of the phosphorus family (defined for the purpose of describing this invention as a member of Group V of the Periodic Table having an atomic weight of greater than 30, i.e., phosphorus, arsenic, antimony and bismuth);

each of the substituents $X_1$ is independently selected from the group consisting of halogen, hydroxyl, mercapto, hydrocarbyloxy and halogen-substituted hydrocarbyloxy; and $X_2$ is selected from the group consisting of halogen, hydroxyl, mercapto, hydrocarbyl, hydrocarbyloxy, halogen-substituted hydrocarbyl, and halogen-substituted hydrocarbyloxy.

Suitable hydrocarbon radicals include alkyl groups of 1 to 18 carbon atoms, preferably 1 to 6 carbon atoms; cycloalkyl groups of 5 to 18 carbon atoms, preferably 5 to 8 carbon atoms; aryl groups of 6 to 18 carbon atoms, preferably 6 to 10 carbon atoms, as well as halogen-substituted species particularly chlorine and bromine substituted species, and hydroxyl-substituted species of the foregoing hydrocarbon radicals. Illustrative examples of the alkyl substituents are methyl, ethyl, propyl, octyl, dodecyl, stearyl, octadecyl, and the like, said alkyl group being a monovalent radical derivable from an aliphatic hydrocarbon by the removal of one hydrogen atom. The halogenated alkyl radicals include chloromethyl, bromoethyl, trifluoromethyl, chlorodecyl, and the like. Suitable aryl substituents include phenyl, benzyl, tolyl, phenylethyl, xylyl, naphthyl, hexylphenyl, and the like, said aryl group being a monovalent radical derivable from an aromatic hydrocarbon by the removal of one hydrogen atom. The aryl radicals can be substituted by halogen, such as in p-chlorophenyl, p-bromophenyl, 2,4-dibromophenyl, p-fluorophenyl, and the like. Typical cycloalkyl substituents include cyclohexyl, cyclopentyl, cycloheptyl, cyclooctyl, and the like, said cycloalkyl group being a monovalent radical derivable from an alicyclic hydrocarbon by the removal of one hydrogen atom. Suitable halogen-substituted cycloalkyl radicals include chlorocyclohexyl, bromocyclopentyl, and fluorocyclohexyl, and the like.

The preferred member of the phosphorus family in the preparation of the compositions of the invention is phosphorus. Suitable phosphorus compounds include: phosphorus trichloride, phosphorus tribromide, phenylphosphorodichloridite, phenylphosphorodibromidite, p-chlorophenylphosphorodichloridite, benzylphosphorodichloridite, cyclohexylphosphorodichloridite, allylphosphorodichloridite, butylphosphorodichloridite, octylphosphorodichloridite, triphenyl phosphite, trimethyl phosphite, trilauryl phosphite, diphenylmethyl phosphite, tributyl phosphite, tribenzyl phosphite, tris(B-chloroethyl) phosphite, tris(2-bromoethyl) phosphite, phenyldichlorophosphine, phenyldibromophosphine, p-chlorophenyldichlorophosphine, m-chlorophenyldichlorophosphine, butyldichlorophosphine, benzyldichlorophosphine, cyclohexyldichlorophosphine, dimethyl ethylphosphonite, dimethyl phenylphosphonite, bis(chloropropyl) chloropropylphosphonite, bis(2,3-dibromopropyl)-2,3-dibromopropyl phosphonite, dibenzyl methyl phosphonite, and the like. Additional phosphorus compounds include methyl phosphonous acid, phenylphosphonous acid, tolylphosphonous acid, methylphosphorous acid, phenylphosphorous acid, dimethyl phosphorous acid, dibutyl phosphorous acid, diphenyl phosphorous acid, methyl butyl phosphonous acid, diphenyl phosphonous acid, dibutylphosphonous acid, phosphorous acid, and the like.

Illustrative compounds of the other members of the phosphorus family, i.e., arsenic, antimony, and bismuth, include the following compounds: tris(n-butyl) arsenite, tris(n-octyl) arsenite, tribenzyl arsenite, butylarsinic acid, phenylarsinic acid, tris(n-heptyl) antimonite, tris(n-octyl) antimonite, tris(2-ethylhexyl) antimonite, tribenzyl antimonite, tris(B-chloroethyl) antimonite, tris(B-chlorobutyl) antimonite, methylstibinic acid, butylstibinic acid, octylstibinic acid, octadecylstibinic acid, phenylstibinic acid, tris(n-butyl) bismuthite, tris(n-octyl) bismuthite, tris(B-chloroethyl) bismuthite, and the like.

In the practice of this invention, mixtures of compounds of a given member of the phosphorus family can be employed in preparing the esterification products of the invention, e.g., a mixture of phosphorus trichloride and triphenyl phosphite. Also, mixtures of compounds of the various members of the phosphorus family can be employed, e.g., a mixture of triphenyl phosphite and tribenzyl antimonite.

Various reaction conditions can be employed for the reaction of the phenolic condensate and the compound of the member of the phosphorus family depending on the characteristics of the starting materials employed and the desired properties of the final products. Generally, the temperature of the reaction is in the range of 100 to 250 degrees centigrade, preferably in the range of 150 to 200 degrees centigrade. Atmospheric pressure is usually employed for the reaction, but superatmospheric pressure or vacuum conditions can be employed, if desired. Reaction time can vary from 0.5 to 15 hours. Various ratios of reactants can be employed depending on the characteristics of the reactants and desired final products. Generally, up to about 0.5 mole of the compound of the phosphorus family is employed in the reaction mixture per equivalent of phenolic nucleus in the phenolic condensate. The ratio of reactants is preferably within the range of about 0.05 to 0.33 mole of the compound of the phosphorus family per equivalent of phenolic nucleus in the phenolic condensate.

The polymeric esters of the invention generally have up to about 0.5 mole of compound of the phosphorus family incorporated in the composition per equivalent of phenolic nucleus in the phenolic condensate, preferably from about 0.05 to 0.33 mole per equivalent of phenolic nucleus. Generally, a major proportion, i.e., at least 50 percent, of the moiety of the member of the phosphorus family has the structure:

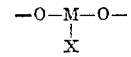

wherein the symbols have the meaning described hereinbefore, and in which the unsatisfied bonds are attached to aryl nuclei of the phenolic condensate. In the compositions of the invention, these unsatisfied bonds are predominantly attached to aryl nuclei of the same molecule of the phenolic condensate. Mixtures of esters are usually obtained.

The polymeric esters of the invention can be modified to produce additionally useful thermoplastic products by reaction of the free phenolic hydroxyl groups with additional reactants. Suitable for this purpose are various oxyalkylation agents such as compounds containing a mono oxirane ring. Monomeric epoxides having 2 to 18 carbon atoms are preferred, of which the alkylene oxides containing 2 to 6 carbon atoms are more preferred. Examples of suitable mono-epoxides are ethylene oxide, propylene oxide, cyclohexene oxide, styrene oxide, allyl glycidyl ether, epichlorohydrin, and the like. Catalysts for the reaction of the oxirane ring compounds with the phenolic hydroxyl groups of the compositions of the invention include the alkali or alkaline earth hydroxides primary amines, secondary amines, tertiary amines, or basic alkali salts. Typical catalysts include sodium and calcium hydroxides, dimethyl, triethyl, and dimethyl benzyl amines, and salts of strong bases and weak acids such as sodium acetate or benzoate. The hydroxyalkylation reaction can be carried out at 0 to 200 degrees centigrade, preferably at 0 to 100 degrees. Other methods of hydroxyalkylation include reaction of the phenolic hydroxyl groups with alkylene halohydrins, such as ethylene chlorohydrin, propylene bromohydrin or glyceryl chlorohydrin in the presence of an alkali metal hydroxide of the type just described. Still another method of hydroxyalkylation includes reaction of the phenolic hydroxyl groups with alkylene carbonates, such as ethylene carbonate and propylene carbonate, using a catalyst such as sodium or potassium carbonate.

The polymeric esters of the invention are particularly useful as inhibitors and stabilizers for polymers such as polyolefins, polyvinyl halides, and the like. Typical polyolefins include the homopolymers and copolymers of unsaturated aliphatic, cycloaliphatic and aromatic hydrocarbons. Suitable monomers are ethylene, propylene, butene, hexene, octene, 2-methylpropene-1, 4-methylhexene-1, bicyclo-(2.2.1)-2-heptene, butadiene, isoprene, pentadiene, 4-vinylcyclohexene, cyclopentadiene, styrene, methylstyrene, and mixtures thereof, such as mixtures of ethylene and propylene, and butadiene and styrene, and the like. The polyolefins in which the esters of the invention are useful include linear, thermoplastics of the foregoing monomers such as polyethylene, polypropylene and polystyrene, as well as the rubbery polymers and copolymers, such as polybutadiene and butadiene-styrene copolymers. The polyvinyl halides include such well known polymers as polyvinyl chloride, polyvinyl fluoride, and the like.

The thermoplastic compositions of the invention, including modifications thereof such as described in the preceding paragraph, can be converted to thermosetting compositions by admixture with a curing agent, such as a suitable donor of methylene radicals. Hexamethylene tetramine is preferably employed for this purpose, but formaldehyde and especially the polymeric forms thereof, such as paraform and trioxane, can also be employed. Such curing agents can be employed in a proportion in the range of 2 to 20 percent based on the weight of the phosphorus ester. The thermosetting compositions can be converted to thermoset or cross-linked products by heating at elevated temperatures, for example, at about 300 to 500 degrees Fahrenheit, for periods of time ranging from a few minutes to one hour or more. Other suitable curing agents include polyepoxides, such as epoxidized soy bean oil, epoxidized cotton seed oil, epoxidized castor oil, epoxidized glycerol trioleate, epoxidized glycerol trilinoleate, epoxidized glycerol dioleate, epoxidized methyl linoleate, epoxidized ethyl linoleate, and the like.

The thermoplastic products of the invention, particularly the hydroxyalkylated products, can also be converted to cross-linked products by reaction with an organic polyisocyanate to produce polyurethane products. Suitable polyisocyanates include 2,4-tolylene diisocyanate, 2,6-tolylene diisocyanate, and mixtures thereof, and particularly the crude mixtures thereof that are commercially available. Other typical polyisocyanates include methylene-bis-(4-phenyl isocyanate), 1,3-cyclopentylene diisocyanate, 2,4,6-tolylene triisocyanate, and the like. Polyfunctional isocyanates are provided by the liquid reaction products of (1) diisocyanates and (2) polyols or polyamines and the like. In addition, isothiocyanates and mixtures of isocyanates can be employed. Also contemplated are the many impure or crude polyisocyanates that are commercially available. Especially preferred are the polyaryl polyisocyanates, particularly polymethylene polyphenylisocyanate.

In preparing such polyurethane compositions, the components are preferably reacted in a ratio sufficient to provide about 85 to 115 percent of isocyanato groups with respect to the total number of hydroxyl groups present in the hydroxyl-containing polymeric material (and foaming agent, if one is provided). The reaction temperature generally ranges from about 20 to about 180 degrees centigrade, although higher and lower temperatures can be employed. Reaction catalysts can be employed, if desired. Suitable catalysts include the tertiary amines, such as triethylamine, and tetramethyl butane diamine. Also suitable are the morpholine compounds, such as N-methyl morpholine. When polyurethane foams are desired, foaming agents are incorporated in the reaction mixture. Foaming agents are generally those materials that are capable of liberating gaseous products when heated, or when reacted with an isocyanate. Preferably, foaming is accomplished by introducing a low boiling liquid into the reaction mixture, such as fluorochlorocarbon boiling in the range of −30 to 50 degrees centigrade. Typical foaming agents include trichlorofluoromethane, trichlorotrifluoroethane, difluoromonochloroethane, and difluorodichloroethane.

The compositions of the invention can be used in a wide variety of product applications. Thus, the thermoplastic compositions can be used in protective coatings of many varieties, for example, in drying oil varnishes. The thermosetting compositions can be compounded with various fillers, pigments, plasticizers, and other additives and used in the preparation of various molded articles of great utility. The compositions can be utilized with various reinforcing media, such as glass fibers, synthetic polymer fibers, asbestos, carbon fabric, fibrous aluminum oxide, and the like to provide laminated articles. The thermal stability of the compositions is particularly useful in such products as brake linings, clutch facings, grinding wheels, and abrasive paper and cloth. The compositions are also useful in basing cements and as foundry sand binders. The polyurethane compositions can be utilized for the preparation of foamed products, castings, coatings, and the like.

The ester compositions of the invention are useful for the treatment of normally combustible cellulosic materials to render them fire retardant. The cellulosic materials useful in the invention are any of those derived from natural sources such as from wood, cotton and the like; as well as chemically treated varieties such as regenerated cellulose commonly known as rayon. It is generally preferred that the cellulosic material be consolidated in the form of a self-supporting sheet such as paper, or a woven or nonwoven fabric. Paper is the preferred cellulosic material of the invention, and all types of paper, made by any of the well-known paper production processes, are contemplated. The ester composition is generally employed in an amount to provide 30 to 100 percent by weight based on the weight of the cellulosic material.

The cellulosic material to be treated is contacted with a solution of the esterification product of the invention in a suitable solvent, such as a ketone, such as those described hereinbefore, or a halocarbon, such as carbon tetrachloride, chloroform, methylchloroform, dichloroethylene, trichloroethylene, ethylene dibromide, propylene dibromide, and the like. Generally the solvents have a boiling point less than 150 degrees centigrade. The contacting step may be carried out in a variety of ways. For example, the cellulosic material can be immersed in a tank containing the solution for a suitable period of time in a batch-wise manner, or can be continuously passed through such a tank by means of rollers which facilitate the passage of a cellulosic sheet such as paper. The composition can also be applied to cellulosic material by spraying, or by passing a sheet of the material through rollers that have been wetted with the solution. The phosphorus composition can be added to the beater in a paper making process. The temperature of the process can be varied over wide limits, but is preferably at room temperature, or about 30° C. When the cellulosic material has been treated with the solution, the excess solution is drained or squeezed out, and the treated cellulosic material is dried at a temperature up to 150° C. Generally, a suitable curing agent, such as hexamethylene tetramine, is included in the treating solution. Then the dried, treated cellulosic material can be subjected to curing conditions to cure the ester composition by the methods disclosed herein.

The following examples illustrate the various aspects of the invention, but are not intended to limit the invention. Unless specified otherwise, temperatures are given in degrees centigrade and parts are by weight.

EXAMPLE 1

500 parts by weight of anhydrous phenol were heated to 80 degrees centigrade, and mixed with a slurry of 0.9 part of calcium hydroxide in 25 parts of water in a reactor provided with a condenser and in communication with the atmosphere. The mixture was elevated to a temperature of 160 degrees centigrade to remove the added water and provide a substantially anhydrous mixture. While maintaining the temperature at 160 degrees centigrade, 81 parts by weight of a 37 weight percent aqueous solution of formaldehyde was introduced portion-wise beneath the surface of the phenol over a period of two hours. During the reaction distillate was taken overhead from the reaction mixture. The distillate contained chiefly water with a few percent of formaldehyde and phenol. The reaction temperature was maintained at about 160 degrees centigrade until substantially all the water had been removed from the reaction mixture, and thereafter the temperature was elevated to about 200 degrees centigrade to remove unreacted phenol. The product of the process was analyzed and found to contain about 95 percent of material containing o,o'-alkylidene linkage, about 3 percent of material containing o,p'-alkylidene linkage, and about 2 percent of material having p,p'-alkylidene linkage.

The foregoing example illustrates the preparation of a phenol aldehyde condensation product having a high proportion of o,o'-alkylidene linkage.

The following example illustrates the result of reacting a phosphorus compound of the invention with a phenol-aldehyde condensate having a small proportion of o,o'-alkylidene linkages.

EXAMPLE 2

Comparative example

Into a stirred reactor there were placed about 100 parts of a phenol-formaldehyde novolac having about 10 percent o,o'-alkylidene linkages and an average molecular weight of 500. The reactor was heated to 120° C. and $PCl_3$ was slowly added. After the addition of only a few parts of $PCl_3$ the novolac gelled.

EXAMPLE 3

A solution of 296 parts of 2,4,6-tri-t-butylphenol in 400 parts of triethyl amine and 500 parts of diethylene glycol dimethyl ether was added portionwise to 155 parts of $PCl_3$. The reaction was conducted under a dry nitrogen atmosphere at a temperature of 10–20° C. After the addition was complete, the mixture was stirred at this temperature for one-half an hour, and then heated to 100° C. A solution of 250 grams of a high ortho content phenol-formaldehyde novolac, having about 95 percent o,o'-alkylidene linkages and an average molecular weight of about 550, in 500 parts of diethylene glycol dimethyl ether, was added portionwise during a 1.5 hour period. Heating was continued for an additional 16 hours. After cooling, the mixture was diluted with hexane and thoroughly washed with water. The remaining solids were filtered off and dried in an oven at 60° C., under reduced pressure. The product was a light tan fusible powder.

EXAMPLE 4

50 parts of a powdered high ortho content phenol-formaldehyde novolac used in Example 3 were slowly added to 300 parts of $PCl_3$ at 20–30° C. After the evolution of HCl had subsided, the mixture was heated at 60–74° C., for three hours. The cooled mixture was then poured into 2000 parts of ice and water. The resulting solid was filtered off, washed with water until the wash was chloride ion free, and dried at 100° C., under reduced pressure. The product was a light colored fusible powder that contained 9.8% P.

EXAMPLE 5

Sixty-eight parts of the high ortho content phenol-formaldehyde novolac used in Example 3 was heated to 140° C. At this point, it was fluid and readily stirrable. Then, $PCl_3$ was slowly introduced below the surface of the resin until no more would react. This required 1.5 hours. Heating was continued for an additional 1.5 hours with excess $PCl_3$ present, as evidenced by a steady reflux. The cooled mixture was then discharged into 5000 parts of ice and water. The resulting solid was pulverized, and thoroughly washed with water. The product was soluble in dimethyl formamide. The product contained about 9 percent phosphorus, and a major proportion of the phosphorus was chemically combined in the product in the form of the cyclic structure wherein two bonds of the phosphorus atom are joined to phenoxy radicals of the same molecule of phenolic condensate.

EXAMPLES 6 TO 11

The procedure of Example 5 is repeated with high ortho content phenolic condensates based on other carbonyl compounds and phenols to produce useful products of the invention.

| Example No. | Carbonyl compound | Phenol |
|---|---|---|
| 6 | Formaldehyde | Meta-cresol. |
| 7 | do | 3-methyl-5 ethyl phenol. |
| 8 | do | Isopropyl phenol. |
| 9 | Acetaldehyde | Phenol. |
| 10 | Benzaldehyde | Do. |
| 11 | Crotonaldehyde | p-Chlorophenol. |

EXAMPLE 12

One-tenth weight percent of the product of Example 5 is mixed with unstabilized polypropylene powder. The mixture is placed in a flat bottomed container of such size that, after fusing, the resulting film is approximately one-eighth inch thick. The container is then placed in an air circulating oven at 175° C., for 25 minutes. There is essentially no change in weight and the resulting film was not colored and quite flexible.

Similar treatment of polypropylene not containing the product of Example 5 results in a gain in weight of the specification, probably due to oxygen pick up. The resulting film is crazed and brittle.

EXAMPLE 13

To 22 parts of di-2 ethylhexylphathalate there is added 0.25 part of the product of Example 5, 1 part of barium-cadmium laurate and 50 parts of polyvinylchloride. This mixture is then formed on hot rolls (153–155° C.) into a film approximately .02–.04 inch thick. Samples of the film thus formed (composition A) are placed in an air circulating oven at 175° C., along with samples of a film made in the same way but not containing the product of Example 5 (composition B). Observation of film samples at intervals of time indicates only a minor change in color of composition A, but the composition B becomes black in color in the same length of time.

EXAMPLE 14

The product of Example 3 was mixed with 10% by weight of hexamethylene tetramine and cured into a hard, infusible resin by heating at 185° C. The resin thus obtained burned with difficulty when placed in a flame of a gas burner to give a large, hard ash. The resin was self-extinguishing.

EXAMPLE 15

Twenty-five parts of the resinous product of Example 5 and 2.5 parts of hexamethylene tetramine were dissolved in 75 parts of dimethylformamide at 80° C. Paper was soaked in this solution and then squeezed until the weight gain of the wet paper was 80 percent. It was then dried in a hot oven and cured at 180° C. The resulting paper was stiff and burned only with difficulty.

EXAMPLE 16

One hundred parts of the high ortho novolac used in Example 3 were heated to 160° C. in a stirred reactor.

Then 36.2 parts of arsenic trichloride were added portionwise during a 5 hour period with the temperature of the reaction mixture maintained in the range of 160–185° C. Heating was continued for an additional 16 hours. The reaction mixture did not change much in viscosity. It was poured into a container and allowed to harden into a brittle resin. The product contained about 12% As and 2.7% Cl. The product was readily curable with hexamethylene tetramine to produce a fire retardant product.

EXAMPLES 17 TO 23

Using the procedure of Example 5, other trivalent compounds of the phosphorus family are employed to produce similarly useful products of the invention.

Compound of phosphorus family

Example No.:
17 _____ Triphenyl phosphite.
18 _____ Phenylphosphorodichloridite.
19 _____ Butyldichlorophosphine.
20 _____ Dimethyl methylphosphonite.
21 _____ Dimethyl phosphorus acid.
22 _____ Tribenzyl antimonite.
23 _____ Tris (n-butyl) bismuthite.

The esters produced in accordance with the invention preferably have an average of at least about 1.5 free, unreacted phenolic hydroxyl groups per molecule, more preferably at least about 2 such phenolic hydroxyl groups. The esters are capable of forming improved thermoset products, such as by curing with hexamethylene tetramine to produce highly thermal stable products. The esters of the invention also function as improved stabilizers compared to prior art products. The esters of the invention modify polymers such as polypropylene and polyvinyl chloride by stabilizing and plasticizing action.

When the phosphorus esters of the invention are incorporated in polymeric materials, the phosphorus esters are generally employed in a proportion in the range of about 0.01 to about 30 weight percent based on the weight of polymeric material. The proportion sufficient to stabilize polymers in the manner of Examples 12 and 13 is more usually in the range of about 0.01 to 10 weight percent, preferably about 0.05 to 5 weight percent based on the weight of polymer.

In the foregoing specification, the o,o'-alkylidene content of the phenolic condensates is determined by reacting the phenolic condensate with trimethylchlorosilane to react all the phenolic hydroxyl groups. The resulting composition is fractionated by vapor phase chromatography, and the proportion of the o,o'-isomer is determined.

While this invention has been described with reference to certain specific embodiments, it will be recognized by those skilled in the art that many variations are possible without departing from the spirit and scope of the invention.

What is claimed is:
1. An ester of a trivalent member of the phosphorus family and a phenolic condensate selected from the group consisting of a phenol-aldehyde condensate and a phenol-ketone condensate, characterized in that:
(1) a major proportion of the moiety of the member of the phosphorus family has the formula:

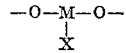

in which the unsatisfied bonds are attached to aryl nuclei of the same molecule of phenolic condensate, and wherein:
M is an atom of the phosphorus family, and
X is selected from the group consisting of halogen, hydroxyl, mercapto, hydrocarbyl, hydrocarbyloxy, halogen-substituted hydrocarbyl, halogen-substituted hydrocarbloxy, and an arloxy radical of the same molecule of phenolic condensate to which M is attached;
(2) at least 60 percent of the phenolic condensate has o,o'-alkylidene linkages;
(3) the phenolic condensate has an average number of aryl nuclei per molecule in the range of about 4 to 8; and
(4) the ester has an average of at least about 2 unreacted phenolic hydroxyl groups per molecule.

2. A mixture comprising hexamethylene tetramine and an ester of a trivalent member of the phosphorus family and a phenolic condensate selected from the group consisting of a phenol-aldehyde condensate and a phenol-ketone condensate, characterized in that:
(1) a major proportion of the moiety of the member of the phosphorus family has the formula:

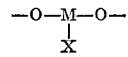

in which the unsatisfied bonds are attached to aryl nuclei of the same molecule of phenolic condensate, and wherein:
M is an atom of the phosphorus family, and
X is selected from the group consisting of halogen, hydroxyl, mercapto, hydrocarbyl, hydrocarbyloxy, halogen-substituted hydrocarbyl, halogen-substituted hydrocarbyloxy, and an aryloxy radical of the same molecule of phenolic condensate to which M is attached;
(2) at least 60 percent of the phenolic condensate has o,o'-alkylidene linkages;
(3) the phenolic condensate has an average number of aryl nuclei per molecule in the range of 3.5 to 8; and
(4) the ester has an average of at least about 1.5 unreacted phenolic hydroxyl groups per molecule.

3. A mixture comprising hexamethylene tetramine, a solvent and an ester in accordance with claim 2.

4. A cured product of hexamethylene tetramine and an ester in accordance with claim 2.

5. A fire retardant cellulosic composition comprising a normally combustible cellulosic material and a cured product of hexamethylene tetramine and an ester in accordance with claim 2.

6. An ester of trivalent phosphorus and a phenol-aldehyde condensate, characterized in that:
(1) a major proportion of the phosphorus moiety has the formula:

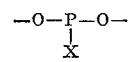

in which the unsatisfied bonds are attached to aryl nuclei of the same molecule of the phenol-aldehyde condensate, and wherein:
X is selected from the group consisting of halogen, hydroxyl, mercapto, hydrocarbyl, hydrocarbyloxy, halogen-substituted hydrocarbyl, halogen-substituted hydrocarbyloxy and an aryloxy radical of the same molecule of phenol-aldehyde condensate to which the phosphorus atom is attached;
(2) at least 60 percent of the phenol-aldehyde condensate has o,o'-alkylidene linkages;
(3) the phenol-aldehyde condensate has an average number of aryl nuclei per molecule in the range of about 4 to 8; and
(4) the ester has an average of at least about 2 unreacted phenolic hydroxyl groups per molecule.

7. A mixture comprising hexamethylene tetramine and an ester in accordance with claim 6.

8. A mixture comprising hexamethylene tetramine, a solvent and an ester in accordance with claim 6.

9. A cured product of hexamethylene tetramine and an ester in accordance with claim 6.

10. A fire retardant cellulosic composition comprising a normally combustible cellulosic material and a cured product of hexamethylene tetramine and an ester in accordance with claim 6.

References Cited
UNITED STATES PATENTS

| | | | |
|---|---|---|---|
| 3,144,419 | 8/1964 | Guttag | 260—59 |
| 3,297,631 | 1/1967 | Bown et al. | 260—45.95 |
| 3,341,629 | 9/1967 | Larrison | 260—45.95 |
| 3,355,421 | 11/1967 | Cook | 260—45.7 P |
| 3,367,870 | 2/1968 | Spivack | 260—45.95 |
| 3,367,996 | 2/1968 | Strauss et al. | 260—848 |
| 3,527,725 | 9/1970 | Strauss et al. | 260—848 |

JOHN C. BLEUTGE, Primary Examiner

U.S. Cl. X.R.

51—298; 252—400; 260—2.5 AJ, 3, 45.7 R, 45.7 P, 45.95, 50, 53 R, 53 EP, 59, 836, 845, 846, 847, 848, 874, 897 R, 899, 900